INVENTOR.
Bernard H. Gwynn.
BY Horace H. Cooke
ATTORNEY

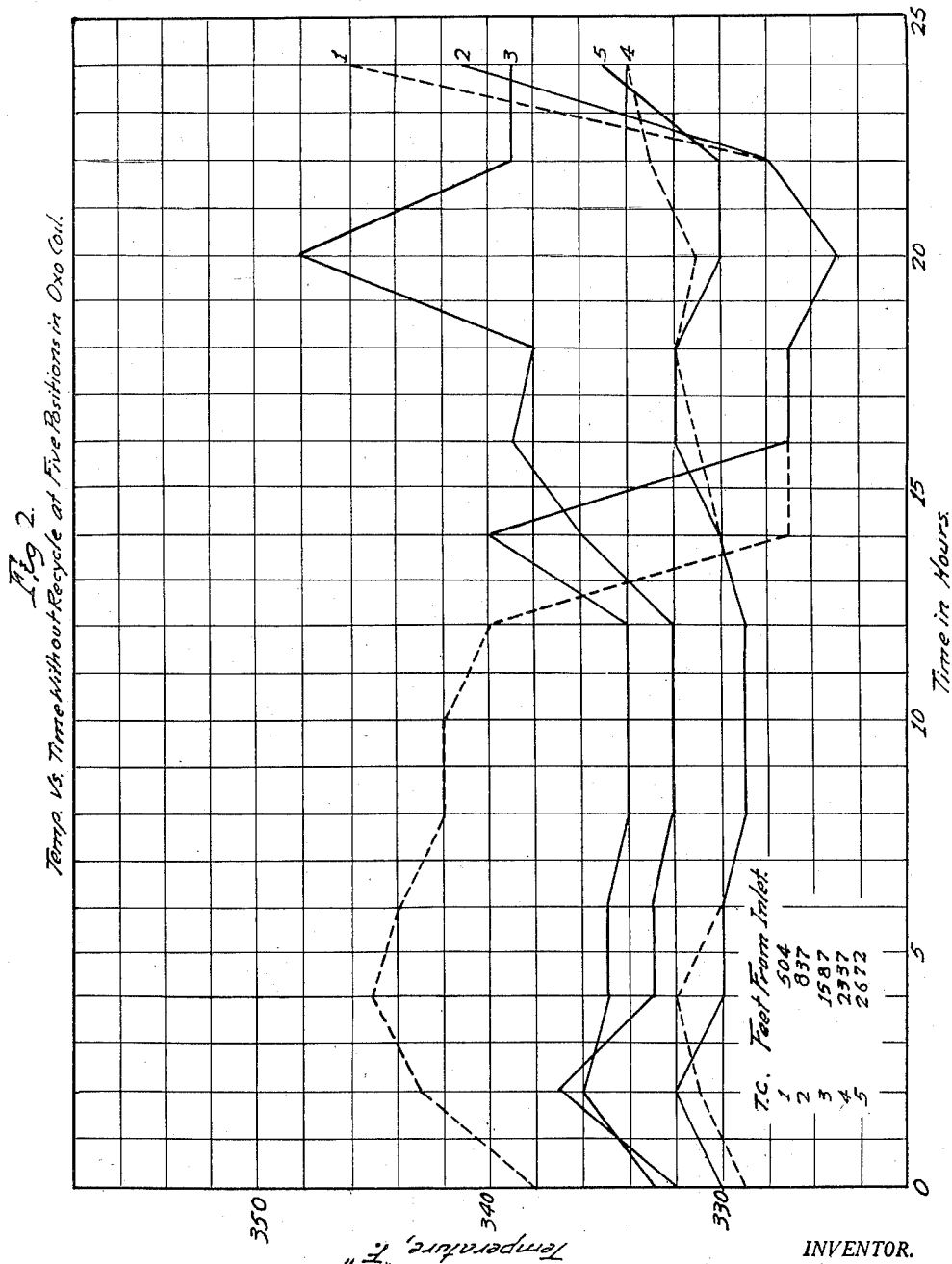

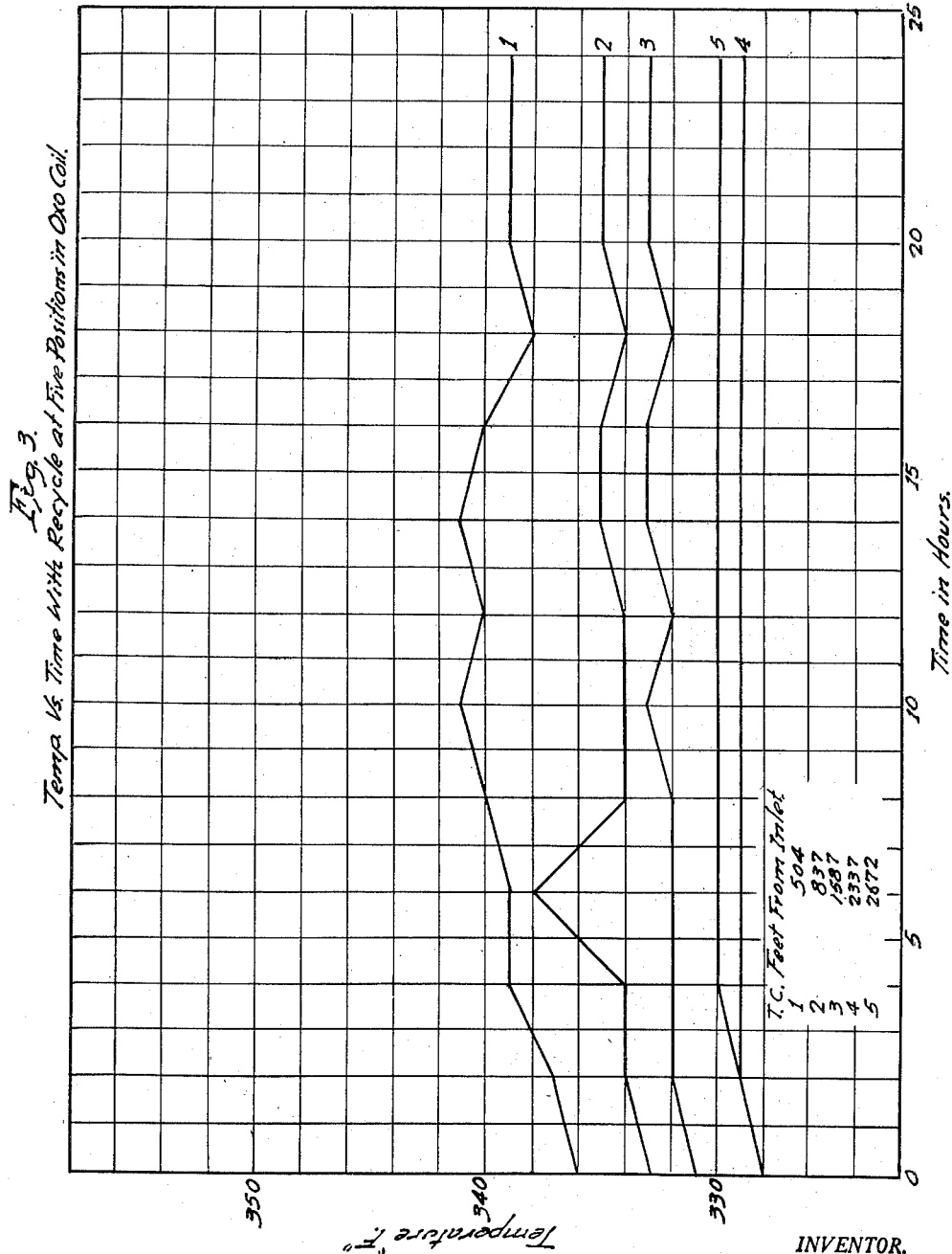

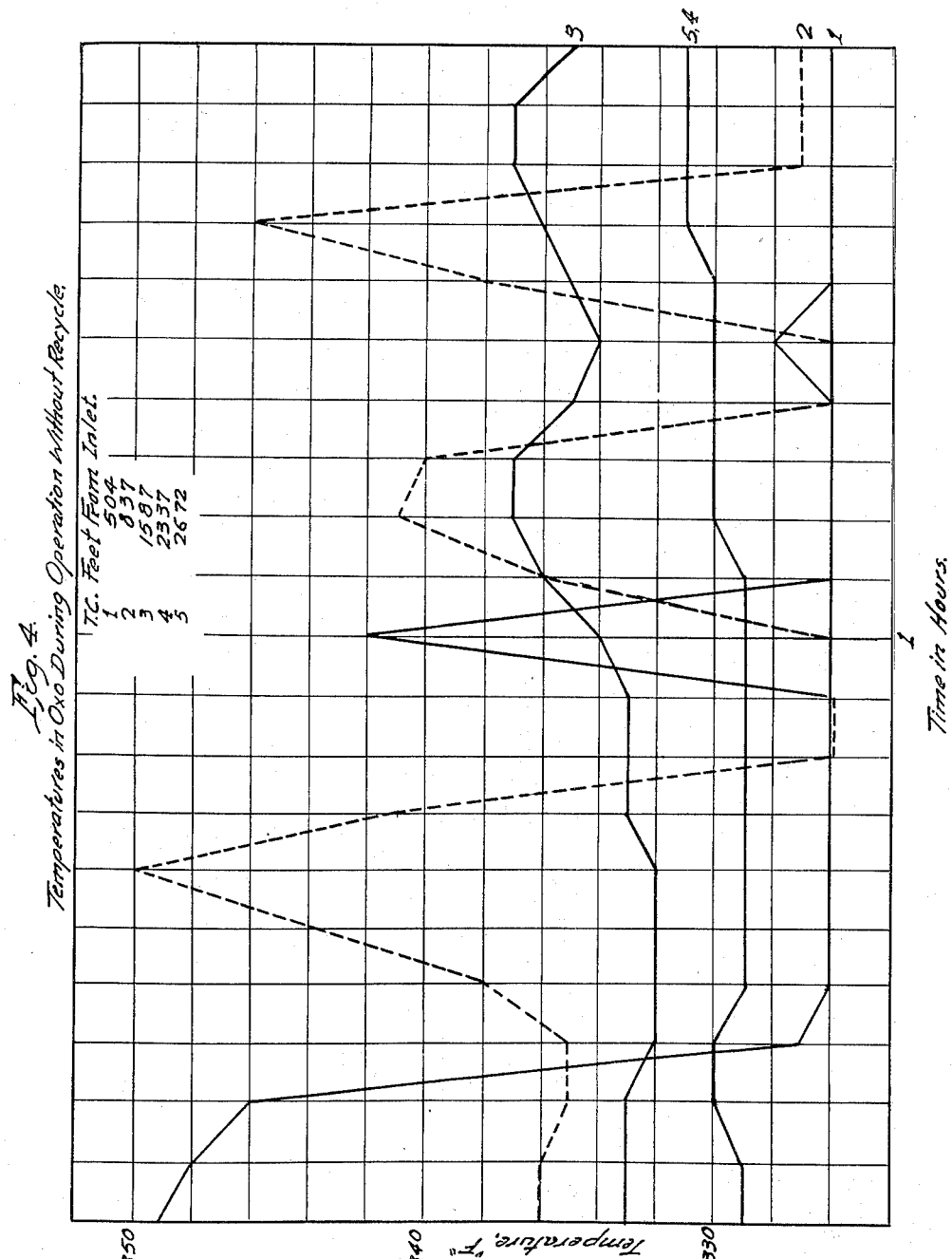

2,779,795
HYDROFORMYLATION OF OLEFINS; TEMPERATURE STABILIZATION

Bernard H. Gwynn, Fawn Township, Allegheny County, Pa., assignor to Gulf Research & Development Company, Pittsburgh, Pa., a corporation of Delaware Application March 10, 1954, Serial No. 415,235

5 Claims. (Cl. 260—604)

This invention relates to a process for carrying out reactions in which hydrogen and carbon monoxide are added to organic compounds and more particularly to an improved process for continuously hydroformylating olefins.

The addition of one hydrogen atom to a carbon atom joined to another by a double bond in an olefin and the addition of a formyl group to the other carbon atom, or the hydroformylation of olefins, has also been called carbonylation or oxonation. In the hydroformylation stage of the Oxo process, for example, it has been proposed to hydroformylate olefins in the presence of a Fischer-Tropsch catalyst by reacting the olefins with hydrogen and carbon monoxide at an advanced pressure such as a pressure in the range of about 750 to about 10,000 lbs. per square inch and at a temperature in the neighborhood of about 100° to about 600° F. The predominant hydroformylation reactions which occur are those resulting in the production of aldehydes. As an example,

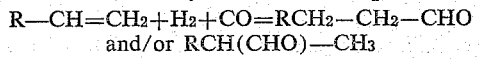

$$R-CH=CH_2 + H_2 + CO = RCH_2-CH_2-CHO$$
and/or $RCH(CHO)-CH_3$ where R is any organic radical. Other reactions producing alcohols, aldols and the like also occur.

In carrying out the hydroformylation reaction, the reactants are first raised to a temperature at which hydroformylation occurs at a reasonable rate. When such a rate is obtained, however, it is necessary to remove a large amount of heat from the reaction area to control the reaction and maintain the desired temperature, because the hydroformylation reaction is highly exothermic. In order to obtain a product of high purity and in good yields in the hydroformylation reaction zone, however, it is extremely important that the temperatures throughout the hydroformylation reaction zone be carefully controlled. This temperature control substantially prevents the decomposition of the hydroformylation catalyst and the formation of undesirable decomposition and/or polymerization products in the hydroformylation product.

While the hydroformylation reaction can be carried out at a temperature in the range of about 100° to about 600° F. and a pressure in the range of about 750 to about 10,000 pounds per square inch, it is important, once a temperature has been reached at a selected partial pressure of carbon monoxide wherein optimum yields of aldehyde are produced, that the temperature be maintained throughout the hydroformylation reaction zone within a range of about 20° F. This temperature control can be effected by carrying out the hydroformylation reaction in an elongated tubular reaction zone in indirect heat exchange relationship with a heat transfer medium.

Although the temperature throughout the hydroformylation coil reactor sholud be maintained within a range of about 20° F. to obtain the desired aldehyde product in good yields and of high purity, it is exceedingly important that the temperature at any point in the elongated reaction zone be stabilized and vary no more than about 7° F. and preferably no more than about 5° F. Maintenance of the temperature at any selected point in the elongated reaction zone within the ranges identified above results in a process and a product that can be closely controlled and varied at will.

I have found that the temperature within the coil reactor can very effectively be stabilized at any point in the hydroformylation reactor within the above limits by recycling a relatively small amount of the hydroformylation reaction product to the elongated hydroformylation reaction zone. The amount of hydroformylation reaction product which is recycled to obtain the necessary temperature control is not great enough to dilute appreciably the reactants in the coil reactor or absorb an appreciable amount of the heat resulting from the hydroformylation reaction. By recycling only a relatively small amount of the hydroformylation reaction product to the hydroformylation reaction zone, neither the efficiency nor the throughput of the hydroformylation reaction is appreciably affected. The amount of hydroformylation product which must be recycled to the hydroformylation reaction zone to obtain the desired temperature control is about one to about 10 percent by weight, based upon the olefin feed, and preferably should be about 4 to about 6 percent by weight.

While any suitable hydroformylation temperature and pressure can be employed in the practice of my invention, provided the temperature throughout the reaction zone in any given case is controlled within a range of about 20° F. and the temperature at any given point in the reactor varies no more than about 7° F., and preferably no more than about 5° F., I prefer to employ selected hydroformylation temperatures in the range of about 260° to about 460° F. and selected hydroformylation pressures in the range of about 1500 to about 4500 pounds per square inch, the temperature and the pressure selected in a given case being dependent upon the charge stock employed and the other variables of the process.

The composition of the mixture employed in the hydroformylation reaction zone to produce the desired aldehyde product can be varied within wide ranges. The hydrogen to carbon monoxide mol ratio can vary from about 0.5:1 to about 8:1, but in general preferred results are obtained with a mol ratio in the range of about 1:1 to about 3:1. Within this range the mixture of gases or synthesis gas can be economically produced and at the same time the gases discharged from the hydroformylation unit can be readily recycled and reused if desired.

Any olefin or mixture of olefins can be employed in the hydroformylation reaction, but preferred results from a commercial viewpoint are obtained when the olefins contain at least about 4 carbon atoms, and especially preferred results are obtained when the olefins contain about 4 to about 16 carbon atoms. Examples of suitable olefins which can be advantageously used in my process, either alone or mixtures of compounds, are hexanes, heptenes, octenes such as diisobutylenes, triisobutylenes, and tetraisobutylenes. A mixture of olefins containing both 1- and 2-olefins can also be used.

As catalyst for the hydroformylation reaction, I preferably employ a salt of a catalytic metal, such as iron or cobalt, which under the conditions of the process is soluble in the olefin charge. When the catalytic metal salt is a salt of cobalt, preferred results are obtained when the hydroformylation temperatures are selected from the range of about 260° to about 360° F. The actual temperature selected will depend upon charge stock and carbon monoxide partial pressure. Generally the other variables are adjusted so that a temperature in the range of about 300° to about 350° F. can be employed. When the catalytic metal salt is an iron salt, preferred results are obtained when the hydroformylation temperatures are selected from the range of about 360° to about 460° F. In this way, the catalytic metal is readily introduced into the reaction zone and the salt is rapidly converted to an active form which is believed to be a metal carbonyl. Although both iron and cobalt salts can be used in my process, I prefer to employ, for best results, cobalt salts, and for this reason the following description will largely be concerned with a process in which the catalytic metal is cobalt. Preferred results are obtained with cobalt naphthenate, or the cobalt salts of higher aliphatic acids such as 2-ethyl hexanoic acid, lauric, palmitic, and stearic acids.

In order to maintain the temperature throughout the hydroformylation reaction zone within a range of about 20° F., the reaction mixture comprising hydrogen, carbon monoxide, olefin, and hydroformylation catalyst is passed through an elongated tubular reaction zone in indirect heat exchange relationship with a heat transfer medium under turbulent flow conditions. The tubular or coil reactor is about 1 to about 5 inches, and preferably about 3 inches, in diameter and can be up to about 6000 feet in length, preferably between about 600 and about 3000 feet. The ratio of length to diameter, or the elongation factor, of the coil is at least about 1440 and preferably between about 1440 and 72,000. Conditions of flow of the reactants through the coil reactor are adjusted to permit a residence period therein of about 10 to about 40 minutes, a linear velocity of at least about one foot per second, and preferably between about one to about 10 feet per second, and a Reynolds number of at least about 11,000. The Reynolds number criterion is determined as pointed out, for example, in "Principles of Chemical Engineering" by Walker, Lewis, McAdams, & Gilliland, 3rd edition, McGraw-Hill Book Company, Inc., particularly page 82.

The length of the coil reactor can be increased so that the coil is sufficiently long to contain a preheating zone and a hydroformylation zone. Such a reactor can be efficiently designed and fabricated to withstand hydroformylation pressures such as about 4500 pounds per square inch or higher. Excellent heat transfer is obtained between fluids within the coil and the liquid boiling outside the coil. This is true in the portion of the coil which is used for preheating and the portion of the coil used for the reaction.

Although the process as described is operative to produce aldehydes without recycle, it has been discovered that by recycling a very small fraction of the product as described, precise temperature control is maintained and the yields of the desired product are increased.

A method of carrying out an embodiment of my invention in which a coil type reactor is used and a relatively small amount of the hydroformylation reaction product is recycled to the hydroformylation reaction zone for the purpose of stabilizing the temperature at any designated point therein will now be described in connection with the accompanying drawings which are hereby incorporated in and made a part of the present specification.

Figure 2 is a graph of temperature at five positions in the coil reactor versus time without recycle of the hydroformylation reaction product to the hydroformylation reaction zone.

Figure 3 is a graph similar to that of Figure 2, except that a portion of the hydroformylation reaction product is recycled to the hydroformylation reaction zone.

Figure 4 is a graph similar to that of Figure 2 except that the time intervals are on a six-minute cycle.

Figure 1:
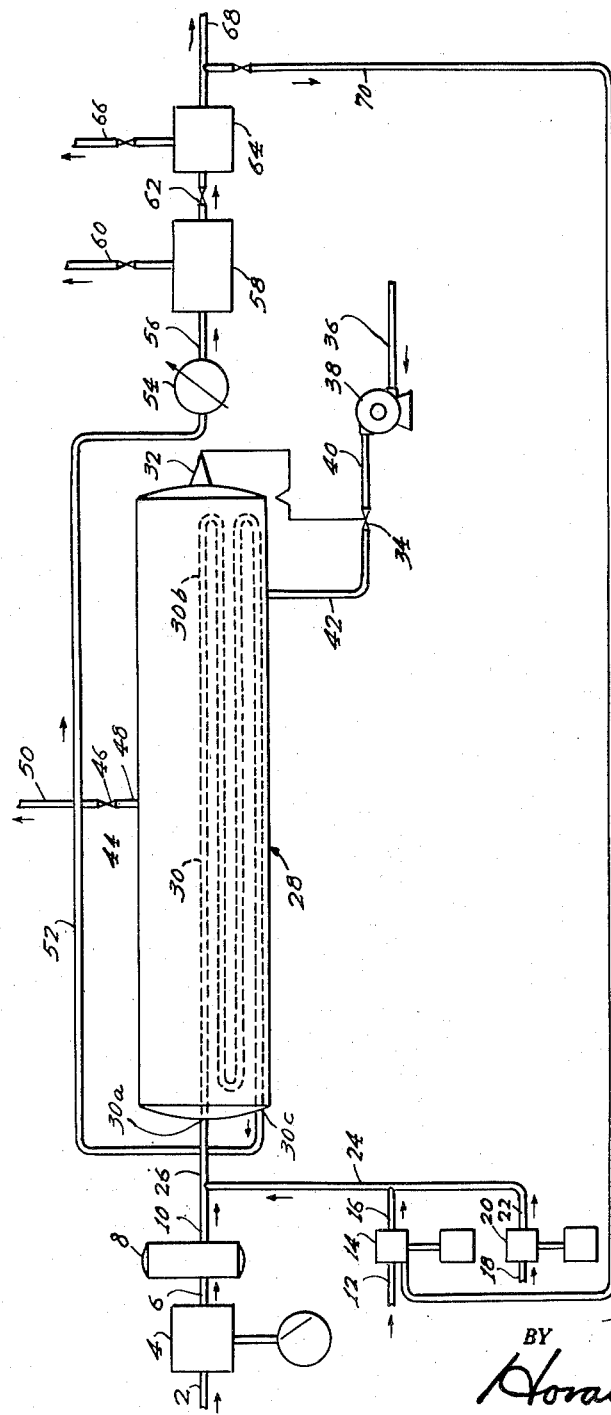
Figure 1 is a simplified flow sheet of a reactor system suitable for practicing the process of the invention.

Referring to Figure 1, and describing a typical operation in accordance with my invention, synthesis gas with a hydrogen to carbon monoxide ratio of about 1:1 is introduced at a rate of about 610,000 standard cubic feet per stream day by means of line 2 to compressor 4 wherein the synthesis gas is compressed to a pressure of about 1750 pounds per square inch at a temperature of about 350° F. The compressed gas is passed by means of line 6 to surge tank 8, from where it is removed by line 10.

About 159 barrels of heptene per stream day (42 gallons per barrel) are introduced by means of line 12 to pump 14 and are discharged from the pump at a pressure of about 1750 pounds per square inch and a temperature of about 90° F. by means of line 16. About 395 pounds per day of cobalt 2-ethyl hexanoate dissolved in sufficient solvent naphtha or olefin charge stock to form a liquid containing about 6 weight percent cobalt as cobalt 2-ethyl hexanoate are introduced by means of line 18 to pump 20 and are discharged at a pressure of about 1750 pounds per square inch at a temperature of about 90° F. by means of line 22. The cobalt 2-ethyl hexanoate in line 22 and the olefins in line 16 are combined in line 24. The synthesis gas in line 10 and the cobalt 2-ethyl hexanoate dissolved in olefins in line 24 are combined in line 26 to form a mixture at a pressure of about 1750 pounds per square inch and a temperature of about 200° F.

The mixture in mixed fluid phase formed of the synthesis gas containing the liquid olefins in which the cobalt salt is dissolved is introduced into the coil reactor 28 at the beginning of the coil 30 at point 30a. The coil, made of about 3000 feet of three-inch inside diameter tubing, is maintained in a constant level of boiling water by means of liquid level controller 32 which actuates valve 34 and admits 2300 gallons per stream day of water through line 36, pump 38, and line 40, to the valve 34, and then by line 42 to the coil reactor.

The temperature in the coil reactor is maintained at about 300° F. by adjusting the pressure control regulator 44 to operate valve 46 in the reactor discharge line 48 at about 52 pounds per square inch gauge pressure. Under these conditions about 19,000 pounds per stream day of steam are discharged through line 50.

The mixture of reactants introduced into the coil reactor is heated in the first or preheating portion of the coil 30 which extends in this case about 300 feet from the beginning of the coil at 30a to the end of the preheating section 30b. As soon as the mixture has been heated to a temperature of about 300° F., and the desired cobalt catalyst has been prepared dissolved in the olefins in mixed fluid phase, the hydroformylation reaction occurs in the reaction portion of the coil which extends from the end of the preheating section at 30b to the end of the coil at 30c. The products are removed from the coil by means of line 52 at a temperature of about 310° F. and a pressure of about 1740 pounds per square inch. Under these conditions the linear velocity in the coil is about 5 feet per second, the residence time is about 10 minutes, and the Reynolds number is about 258,000. The products in a stream day comprise about 27,100 pounds of $C_8$ aldehydes and about 3100 pounds of high boiling materials; and the unconverted reactants comprise, in addition to the catalyst, about 15,300 pounds of heptene, about 15,350 pounds of carbon monoxide, and about 1100 pounds of hydrogen.

While it has been found that operation in accordance with the embodiment described above will be adequate in maintaining the temperature throughout the hydroformylation reaction zone within a range of about 20° F., it is of further benefit, as noted previously, to stabilize the temperature at any particular point within the hydroformylation reaction zone within a range of about 7° F. and preferably about 5° F. This can be effectively accomplished by recycling a small amount of the hydroformylation reaction product to the hydroformylation reaction zone.

Referring again to Figure 1, and describing a typical process employing the recycle of this invention, the hydroformylation reaction product in line 52 is passed to a cooler 54, where it is cooled to a temperature of about 110° F. The cooled product is removed from cooler 54 by line 56 and led to high pressure separator 58 wherein unreacted gases comprising synthesis gas are removed by valved line 60, which, after treatment to remove entrained metal carbonyls therefrom, can be recycled to line 2 if desired. The remaining product is removed by valved line 62 and passed to low-pressure separator 64, maintained at a pressure of about 300 pounds per square inch, wherein additional unreacted gases comprising synthesis gas are removed and which, after similar treatment, can also be recycled, by means of valved line 66, to line 2. The resultant product leaving low-pressure separator 64 at a pressure of about 300 pounds per square inch is removed by line 68 and a substantial portion thereof is passed, successively, to demetalling towers (not shown) wherein metal carbonyls are removed therefrom, and hydrogenation reactors (not shown) wherein the aldehydes are hydrogenated to the corresponding alcohols.

In accordance with my invention a relatively small amount of the hydroformylation product leaving low-pressure separator 64 in line 68 is recycled by valved line 70 to the suction side of olefin pump 14 at a pressure of about 40 pounds per square inch. If desired, however, the hydroformylation product could be recycled prior to, or after leaving, high-pressure separator 58, and the desired results of the present invention would still be obtained. As noted, the amount of recycle sufficient to effect the desired result is small and does not appreciably decrease the output of the hydroformylation reactor. In accordance with the process immediately described, about 6.3 percent by weight of recycle, based upon the fresh heptene feed, is effective to stabilize the temperature at any particular point in the coil reactor.

In order to more clearly point out the invention and to show the unexpected results obtained by recycle of a small amount of the hydroformylation reaction product, I have made several runs with and without recycle. Temperature readings taken with thermocouple wells inserted in the coil reactor itself were taken over a 24-hour period without recycle and over the same time period with recycle. The Oxo reactor employed consisted of about 3100 feet of 2½ inch schedule 160 pipe, made up of 74 lengths of pipe, each 40 feet long arranged in 9 tiers. About 2.94 to about 3.36 barrels per hour of heptene, about 13,000 standard cubic feet per hour of 1:1 synthesis gas and about 2 gallons per hour of the cobalt salt of 2-ethyl hexanoic acid were passed through the coil reactor. The feed passes consecutively through each tier starting, in the present instance, at the bottom tier and passing upflow through the coil and out. The coil is immersed in a boiling water bath and the temperature of the bath is maintained constant at about 325° F. by control of the pressure on this water bath. The thermocouple wells inserted in the coils are spaced as follows:

| | Feet from inlet |
|---|---|
| Thermocouple No. 1 | 504 |
| Thermocouple No. 2 | 837 |
| Thermocouple No. 3 | 1587 |
| Thermocouple No. 4 | 2337 |
| Thermocouple No. 5 | 2672 |

The data obtained in the run wherein none of the hydroformylation reaction product was recycled to the hydroformylation reactor are presented below in Table I.

TABLE I

*Operating data for Oxo coil operation without recycle*

| Time, Hours | Pressure, Lbs./Sq. In. Gauge | Heptene, Bbl./Hr. | Temperature, °F., in Oxo Coil | | | | | Conversion of Olefins to Aldehydes |
|---|---|---|---|---|---|---|---|---|
| | | | TC #1 | TC #2 | TC #3 | TC #4 | TC #5 | |
| 0 | 3,400 | 3.15 | 338 | 333 | 332 | 329 | 330 | 82.0 |
| 2 | 3,400 | 3.15 | 343 | 336 | 337 | 331 | 332 | 79.0 |
| 4 | 3,350 | 3.15 | 345 | 335 | 333 | 332 | 330 | 79.0 |
| 6 | 3,400 | 3.15 | 344 | 335 | 333 | 330 | 330 | 77.4 |
| 8 | 3,400 | 3.15 | 342 | 334 | 332 | 329 | 329 | 78.9 |
| 10 | 3,400 | 3.15 | 342 | 334 | 332 | 329 | 329 | 79.4 |
| 12 | 3,400 | 3.15 | 340 | 334 | 332 | 329 | 329 | 79.9 |
| 14 | 3,400 | 3.15 | 327 | 340 | 336 | 330 | 330 | 82.2 |
| 16 | 3,400 | 2.94 | 327 | 327 | 339 | 331 | 332 | 79.5 |
| 18 | 3,450 | 2.94 | 327 | 327 | 338 | 332 | 332 | 77.4 |
| 20 | 3,450 | 2.94 | 325 | 325 | 348 | 331 | 330 | 75.5 |
| 22 | 3,450 | 2.94 | 328 | 328 | 339 | 333 | 330 | 75.0 |
| 24 | 3,250 | 2.94 | 346 | 341 | 339 | 334 | 335 | 72.5 |

The time-temperature data in Table I are plotted on Figure 2 and graphically illustrate the extreme fluctuations of temperature occurring at each of the five positions in the coil. While the temperature throughout was maintained within a range of about 20° F. with the exception at the end of 20 hours of operation when the temperature range throughout was 23° F., it can be seen that without recycle the temperature at any of the five positions varied greatly and could not easily be predicted. Thus, the temperature at thermocouple number 1 ranged from a low of 325° F. to a high of 346° F. over the 24-hour period, while the temperature at thermocouple number 3 varied 16° F. over the same period.

The data obtained in the run wherein the feed introduced by the olefin pump consisted of about 93.7 percent by weight of fresh heptene and about 6.3 percent by weight of recycle are presented below in Table II.

TABLE II

*Operating data for Oxo coil operation without recycle*

| Time, Hours | Pressure, Lbs./Sq. In. Gauge | Heptene, Bbl./Hr. | Temperature, °F., in Oxo Coil | | | | | Conversion of Olefins to Aldehydes |
|---|---|---|---|---|---|---|---|---|
| | | | TC #1 | TC #2 | TC #3 | TC #4 | TC #5 | |
| 0 | 3,400 | 2.94 | 336 | 333 | 331 | 328 | 328 | 80.0 |
| 2 | 3,400 | 2.94 | 337 | 334 | 332 | 329 | 329 | 80.0 |
| 4 | 3,450 | 2.94 | 339 | 334 | 332 | 329 | 330 | 82.0 |
| 6 | 3,450 | 2.94 | 339 | 337 | 332 | 329 | 330 | 82.0 |
| 8 | 3,450 | 3.36 | 340 | 334 | 332 | 329 | 330 | 80.0 |
| 10 | 3,450 | 3.15 | 341 | 334 | 333 | 329 | 330 | 81.5 |
| 12 | 3,350 | 3.15 | 340 | 334 | 332 | 329 | 330 | 81.0 |
| 14 | 3,350 | 3.15 | 341 | 335 | 333 | 329 | 330 | 79.3 |
| 16 | 3,400 | 3.15 | 340 | 335 | 333 | 329 | 330 | 78.5 |
| 18 | 3,400 | 3.15 | 338 | 334 | 332 | 329 | 330 | 78.7 |
| 20 | 3,400 | 3.15 | 339 | 335 | 333 | 329 | 330 | 80.7 |
| 22 | 3,400 | 3.15 | 339 | 335 | 333 | 329 | 330 | 79.8 |
| 24 | 3,400 | 3.15 | 339 | 335 | 333 | 329 | 330 | 79.8 |

The time-temperature data in Table II are plotted on Figure 3 and graphically illustrate the temperature stabilizing effect of recycle at each of the five positions in the coil. It will be noted that the greatest variation in temperature at any of the five positions during the 24-hour test period occurred at thermocouple number 1, and that amounted to only 5° F. In addition, it can be seen from Figure 2 that without recycle, not only is there extreme fluctuation in temperature at any of the positions but the reaction is not always taking place at the same place in the coil but keeps shifting from one point to another. With recycle, as can be seen in Figure 3, the temperature remains substantially constant and the order of temperature with the exception of points 4 and 5, which are within about 1° of each other, is always the same, that is, point 1 (the first measured point) is always highest, 2 is next, etc. In view of the fact that the Oxo reaction is believed to be a first order reaction with respect to heptene, inasmuch as at constant reaction conditions the same fractional conversion of reactive olefin occurs in succeeding equal intervals of time, it is apparent that the heat release will be greater in the first part of the coil reactor than in the final portions. The data set forth above show that with recycle the Oxo reaction proceeds smoothly and in accordance with theory, whereas without recycle the reaction is somewhat erratic and unpredictable. It should also be noted that without recycle the percent conversion of olefins to aldehydes was 82.0 but dropped off sharply at the end of 24 hours to 72.5 percent, whereas with recycle the conversion at the end of the test period was substantially identical to the conversion obtained at the beginning of the run.

In order to make a closer study of the temperatures occurring within the coil reactor, temperatures were taken at the same five positions during the run without recycle at six-minute intervals over a two-hour period. The data obtained are set forth below in Table III.

TABLE III

*Temperatures in Oxo coil during operation without recycle*

THERMOCOUPLE READING, ° F.

| Time, min. | #1 | #2 | #3 | #4 | #5 |
| --- | --- | --- | --- | --- | --- |
| 0 | 349 | 336 | 333 | 329 | 329 |
| 6 | 348 | 336 | 333 | 329 | 329 |
| 12 | 346 | 335 | 333 | 329 | 330 |
| 18 | 327 | 335 | 332 | 329 | 330 |
| 24 | 326 | 338 | 332 | 329 | 329 |
| 30 | 326 | 344 | 332 | 329 | 329 |
| 36 | 326 | 350 | 332 | 329 | 329 |
| 42 | 326 | 341 | 333 | 329 | 329 |
| 48 | 326 | 326 | 333 | 329 | 329 |
| 54 | 326 | 326 | 333 | 329 | 329 |
| 60 | 342 | 326 | 334 | 329 | 329 |
| 66 | 326 | 336 | 336 | 329 | 329 |
| 72 | 326 | 341 | 337 | 330 | 330 |
| 78 | 326 | 340 | 337 | 330 | 330 |
| 84 | 326 | 326 | 335 | 330 | 330 |
| 90 | 328 | 336 | 334 | 330 | 330 |
| 96 | 326 | 338 | 335 | 331 | 330 |
| 102 | 326 | 346 | 336 | 331 | 331 |
| 108 | 326 | 327 | 337 | 331 | 331 |
| 114 | 326 | 327 | 337 | 331 | 331 |
| 120 | 326 | 327 | 335 | 331 | 331 |

The time-temperature data in Table III, plotted in Figure 4, show that extreme fluctuations of temperature occur much more frequently than would be apparent from Figure 2. Note especially rapid fluctuations in temperature occurring at points 1 and 2, which clearly show the reactions occurring at these points are not constant or predictable.

While I have shown that the recycle is introduced into the low-pressure side of pump 14 prior to its introduction into the reactor, it is obvious that my invention is not so limited and the recycle can be introduced into the hydroformylation reactor in any manner feasible under the circumstances. Thus, it is within the scope of my invention to introduce the recycle in lines 24 or 26 and still obtain the desired temperature control.

Obviously, many modifications and variations of the invention, as hereinabove set forth, can be made without departing from the spirit and scope thereof and therefore only such limitations should be imposed as are indicated in the appended claims.

I claim:

1. In a process for the hydroformylation of olefins wherein a reaction mixture comprising hydrogen, carbon monoxide, and a composition consisting essentially of olefins having dissolved therein a catalytic metal salt is passed through an elongated reaction zone of restricted cross-sectional area and having a high ratio of wall surface to reactor volume and in indirect heat exchange relationship with a heat transfer medium at selected hydroformylation temperatures and a selected hydroformylation reaction pressure, the improvement which comprises recycling to said elongated reaction zone about one to about 10 percent by weight, based upon the fresh olefin feed, of the hydroformylation reaction product produced therein.

2. In a process for the hydroformylation of olefins wherein a reaction mixture comprising hydrogen, carbon monoxide, and a composition consisting essentially of olefins having dissolved therein a catalytic metal salt is passed through an elongated reaction zone of restricted cross-sectional area and having a high ratio of wall surface to reactor volume and in indirect heat exchange relationship with a heat transfer medium at selected hydroformylation reaction temperatures and a selected hydroformylation reaction pressure, the improvement which comprises recycling to said elongated reaction zone about 4 to about 6 percent by weight, based upon the fresh olefin feed, of the hydroformylation reaction product produced therein.

3. A process for the hydroformylation of olefins which comprises passing a reaction mixture comprising hydrogen, carbon monoxide, and a composition consisting essentially of olefins having dissolved therein a catalytic metal salt at selected hydroformylation reaction temperatures and a hydroformylation reaction pressure through an elongated reaction zone having an elongation factor of at least about 1400 in indirect heat exchange relationship with a heat transfer medium under flow conditions such that the residence period is at least about 10 minutes, the linear velocity is at least one foot per second, the selected hydroformylation reaction temperatures are within a range of about 20° F. throughout the elongated reaction zone, and recycling to said elongated reaction zone for the purpose of stabilizing the temperature therein about one to about 10 percent by weight, based upon the fresh olefin feed, of the hydroformylation reaction product produced therein.

4. A process for the hydroformylation of olefins which comprises passing a reaction mixture comprising hydrogen, carbon monoxide and a composition consisting essentially of olefins having dissolved therein a catalytic metal salt at selected hydroformylation reaction temperatures in the range of about 260° to about 460° F. and a selected hydroformylation reaction pressure in the range of about 1500 to about 4500 pounds per square inch through an elongated reaction zone having an elongation factor of at least about 1440 in indirect heat exchange relationship with a heat transfer medium under flow conditions such that the residence period is about 10 to about 40 minutes, the Reynolds number is at least about 11,000, the average linear velocity is at least about one foot per second, and said selected hydroformylation temperatures are within a range of about 20° F. throughout the elongated reaction zone, and recycling to said elongated reaction zone for the purpose of stabilizing the temperature therein about one to about 10 percent by weight, based upon the fresh olefin feed, of the hydroformylation reaction product produced therein.

5. A process for the hydroformylation of olefins which comprises passing a reaction mixture comprising hydrogen and carbon monoxide in a mol ratio of about 0.5:1 to about 8:1 and a composition consisting essentially of olefins having dissolved therein a cobalt salt at selected hydroformylation reaction temperatures in the range of about 260° to about 360° F. through an elongated reaction zone having an elongation factor of about 1440 to about 72,000 in indirect heat exchange relationship with a heat transfer medium under flow conditions such that the residence time is about 10 to about 40 minutes, the Reynolds number is at least about 11,000, the average linear velocity is about one to about 10 feet per second, and said selected hydroformylation temperatures are within a range of about 20° F. throughout the elongated reaction zone, and recycling to said elongated reaction zone for the purpose of stabilizing the temperature therein about 4 to about 6 percent by weight, based upon the fresh olefin feed, of the hydroformylation reaction product produced therein.

References Cited in the file of this patent
UNITED STATES PATENTS
2,557,701    Smith _____ June 19, 1951